United States Patent
Son

(10) Patent No.: US 7,616,744 B2
(45) Date of Patent: Nov. 10, 2009

(54) ORDER CONFIRMATION SYSTEM USING CLIP AND METHOD THEREOF, AND ON-LINE ACCOMPLISHMENT AUTHENTICATION METHOD OF TRANSACTION ACCOMPLISHMENT USING THE SAME

(75) Inventor: Chang Ho Son, Daegu (KR)

(73) Assignee: Aimenet Co., Ltd., Daegu (KR)

( * ) Notice: Subject to any disclaimer, the term of this patent is extended or adjusted under 35 U.S.C. 154(b) by 882 days.

(21) Appl. No.: 11/134,096

(22) Filed: May 20, 2005

(65) Prior Publication Data

US 2005/0286694 A1   Dec. 29, 2005

(30) Foreign Application Priority Data

Jun. 29, 2004   (JP) .............................. 2004-191301

(51) Int. Cl.
*H04M 11/00* (2006.01)

(52) U.S. Cl. .................... 379/93.12; 705/22; 705/26

(58) Field of Classification Search .................... 705/26, 705/22; 379/142.01
See application file for complete search history.

(56) References Cited

U.S. PATENT DOCUMENTS

2001/0037264 A1* 11/2001 Husemann et al. ............ 705/26
2007/0055572 A1*  3/2007 Galli .......................... 705/22

FOREIGN PATENT DOCUMENTS

KR   20010822 A  * 3/2001

* cited by examiner

*Primary Examiner*—Curtis Kuntz
*Assistant Examiner*—Maria El-Zoobi
(74) *Attorney, Agent, or Firm*—John K. Park; Park Law Firm

(57) ABSTRACT

The present invention relates to improvements of member management and business efficiency so that order information received through a customer's wired or wireless telephone can be used to write an order slip and then output through a print output unit while being displayed on a LCD screen window.

2 Claims, 9 Drawing Sheets

Fig.9

Order slip for customer

Order slip for customer

Amount : 4000

Client : Hong Kil-dong

Oredr Time : 2002-11-20 11:18:19

Contact point : 011-320-3333

5floor, roseday bldg., Suseo-dong, Gangnam-gu, Seoul, Korea

| Product | Number | Price |
|---------|--------|-------|
| Rose    | 2      | 4,000 |

Customer confirm:

- - - - - - - - - - - - - - - - - - - - - - - - - -

Thank you! Aimnet Co., Ltd.

Order slip for shop

Order slip for shop

Amount : 4000

Client : Hong Kil-dong

Oredr Time : 2002-11-20 11:18:19

Contact point : 011-320-3333

5floor, roseday bldg., Suseo-dong, Gangnam-gu, Seoul, Korea

| Product | Number | Price |
|---------|--------|-------|
| Rose    | 2      | 4,000 |

Customer confirm:

- - - - - - - - - - - - - - - - - - - - - - - - - -

Thank you! Aimnet Co., Ltd.

Total Sales

Total Sales

Date : 2002-11-20

Time : 11:37

Shop name : Good Morning Flower

Reg. No. : 5850636

Sales history

| Product | Numberr | Price |
|---------|---------|-------|
| Pansy   | 1       | 3,000 |
| Rose    | 1       | 2,000 |
| White   | 1       | 3,000 |
| Lily    | 2       | 5,000 |

Sum : 13,000

- - - - - - - - - - - - - - - - - - - - - - - - - -

Thank you! Aimnet Co., Ltd.

Processing result during absence

Shall i call a function during absence?
(Yes-button during absence)

Processing result during absence

Date : 2002-11-20

Time : 11:37

Shop name : Good Morning Flower

Reg. No. : 5850636

Processing history : Setting up durung absence

- - - - - - - - - - - - - - - - - - - - - - - - - -

Thank you! Aimnet Co., Ltd.

ORDER CONFIRMATION SYSTEM USING CLIP AND METHOD THEREOF, AND ON-LINE ACCOMPLISHMENT AUTHENTICATION METHOD OF TRANSACTION ACCOMPLISHMENT USING THE SAME

CLAIMING FOREIGN PRIORITY

The applicant claims and requests a foreign priority, through the Paris Convention for protection of Industrial Property, based on a patent application filed in the Japan with number JP-2004-191301, by the applicant, the contents of which are incorporated by reference into this disclosure as if fully set forth herein.

BACKGROUND OF THE INVENTION

1. Field of the Invention

The present invention relates to an order confirmation system using calling line identification presentation (hereinafter, referred to as "CLIP") and method thereof, and on-line accomplishment authentication method of transaction accomplishment using the same, and more particularly, to an order confirmation system using CLIP and method thereof, and on-line accomplishment authentication method of transaction accomplishment using the same, wherein in the case where a user who has became a member of a web site that provides on-line contents transmits goods order information to a distributor who provides predetermined commodities and services using the Internet, or the wired or wireless telephone via a telephone network, a terminal disposed on the distributor side is adapted to compare and analyze a telephone number received through a CLIP service, determine whether the telephone number is a goods order information call or a common call, display a customer's information on the terminal, and controls the customer's input order information to be printed through a predetermined output medium, and in the case where the user purchases desired merchandise through the above method, the terminal is adapted to send information on a purchase history to a main server (of which the user has became a member) that provides on-line contents so that the purchase history information can be authenticated as on-line use accomplishment.

2. Background of the Related Art

In modern society, with the advent of information age with the remarkable development of information communication field and the Internet due to digital revolution, users can be provided with desired information in real time through a computer, a mobile communication terminal or the like.

The Internet that had been simply used for military purposes has recently been widely used without being limited to specific field. As the Internet becomes a part of real life, the number of users that use the Internet rapidly increases. Accordingly, there is a trend that the number of service providers that provide predetermined services to Internet uses also rapidly increases.

With the rapid development of the Internet, the use population of the Internet increases by geometric progression. Thus, electronic commerce using the Internet has been greatly activated through a variety of fields. Electronic commerce through a web-to-web method is mainly performed.

The web-to-web method is usually applied when a seller directly operates an Internet shopping mall. In case of services in which a manager of an Internet shopping mall recruits common small-scale businessmen as members and supplies order information on merchandise to the small-scale businessmen, a web-to-phone method rather than the web-to-web method is usually employed due to the installation cost such as computers.

In case of an on-line order using the conventional web-to-phone method, a manager of an Internet shopping mall has to use a telephone circuit if he wants to transmit goods order information that is received from a shopping mall web site to a real merchandise seller. In this case, since the manager transmits data related to order information, the merchandise seller must have an additional telephone circuit in which a dedicated terminal that can automatically receive a data signal as well as a common call circuit is installed. Due to this, an initial installation cost increases. Further, in the case where a common call is received through the telephone circuit installed in the dedicated terminal, a user may feel inconvenient because he or she has to confirm whether the call is data transmission or a common call.

In case of employing on-line order through the web-to-phone method, a corresponding merchandise seller has to manually write an order history into a predetermined scratch paper whenever he receives a goods order through a telephone, and then provides corresponding goods according to the order history. More particularly, in case of a delivery shop that usually sells goods through delivery, the business processing speed will be slow if orders have to be manually written. Further, as there will be a case where the delivery is delayed due to a miswriting, business efficiency is lowered. It is also difficult to maintain systematic and continuous member management only through scratch paper into which a received order history is written as a temporary expedient. In addition, if a consumer cannot use the Internet, he cannot order a desired product. Thus, there is a problem in that goods can be ordered under an environment in which the Internet is always available.

Meanwhile, in the prior art method, a user who has became a member of a web site that provides predetermined contents through the Internet usually has to have access to a corresponding Internet web site, select desired goods to buy, and then send this fact to a corresponding distributor using a computer, facsimile, other receiving devices, etc. through an Internet network or a public telephone network. In this case, the user can receive favors, such as mileage and points for purchase accomplishment, only when he or she purchases goods through a shopping mall of an on-line web site of which he or she has became a member, but cannot receive authentication for on-line use accomplishment when he purchases desired merchandise in an on-line contents member shop registration shop through a wired or wireless telephone.

Further, in the conventional method, in the case where an order call is received through the same telephone number as that of a customer database that is previously constructed in a shop, a customer's information that is previously input is displayed on a computer monitor, and the customer's order history is displayed. In order to transmit the customer's order and purchase information to a main server on-line, however, a computer that supports the Internet has to be separately provided. Accordingly, the prior art method has problems in that the economic load is high and member management is thus not performed in a systematic and continuous manner.

SUMMARY OF THE INVENTION

Accordingly, the present invention has been made in view of the above problems, and it is an object of the present invention to provide an order confirmation system using CLIP and method thereof, and on-line accomplishment authentication method of transaction accomplishment using the same, wherein member management and business efficiency can be improved in such a way that order information received through a customer's wired or wireless telephone is used to write an order slip and then output through a print output unit while being displayed on a LCD screen window.

To achieve the above object, according to an aspect of the present invention, there is provided an order confirmation method using CLIP, including the steps of transmitting information on a member, which is joined as a member of an Internet shopping mall and stored in a database, to an order confirmation apparatus installed as a member shop, and then databasing the information, allowing the order confirmation apparatus to determine whether a telephone number received through a customer's wired or wireless telephone exists in the telephone number stored in the database using a CLIP service, if the received telephone number exists in the telephone number stored in the database, allowing the order confirmation apparatus to recognize the telephone number as a member customer, to execute a customer management program and then to process input order information, and if the received telephone number does not exist in the telephone number stored in the database, allowing the order confirmation apparatus to recognize the telephone number as a new customer and then to connect the telephone number to a common telephone, if a call coincident with a telephone number of a PSTN switchboard that transmits data to the order confirmation apparatus is received, allowing the order confirmation apparatus to automatically switch to a data receive mode, to receive data, and then to output the received data on a LCD screen window, and allowing a print output unit to print the customer's input order information, which is displayed on the LCD screen window, on paper in the form of an order slip.

According to another aspect of the present invention, there is provided an order confirmation system using CLIP includes means for transmitting information on a member, which is joined as a member of an Internet shopping mall and stored in a database of a web server, to an order confirmation apparatus installed as a member shop, and then databasing the information, means for determining whether a telephone number received through a customer's wired or wireless telephone exists in the telephone number stored in the database using a CLIP service, means for, if the received telephone number exists in the telephone number stored in the database, recognizing the telephone number as a member customer, executing a customer management program and then processing input order information, and if the received telephone number does not exist in the telephone number stored in the database, recognizing the telephone number as a new customer and then connecting the telephone number to a common telephone, means for, if a call coincident with a telephone number of a PSTN switchboard that transmits data to the order confirmation apparatus is received, automatically switching to a data receive mode, receiving data, and outputting the received data on a LCD screen window, and means for printing the customer's input order information, which is displayed on the LCD screen window, on paper in the form of an order slip.

BRIEF DESCRIPTION OF THE DRAWINGS

Further objects and advantages of the invention can be more fully understood from the following detailed description taken in conjunction with the accompanying drawings in which:

FIG. 9 shows examples of output matters output by means of the order confirmation apparatus according to the present invention.

DETAILED DESCRIPTION OF THE PREFERRED EMBODIMENT

Hereinafter, an order confirmation system using CLIP and method thereof, and on-line accomplishment authentication method of transaction accomplishment using the same according to the present invention will be described with reference to the accompanying drawings.

Figure 1:
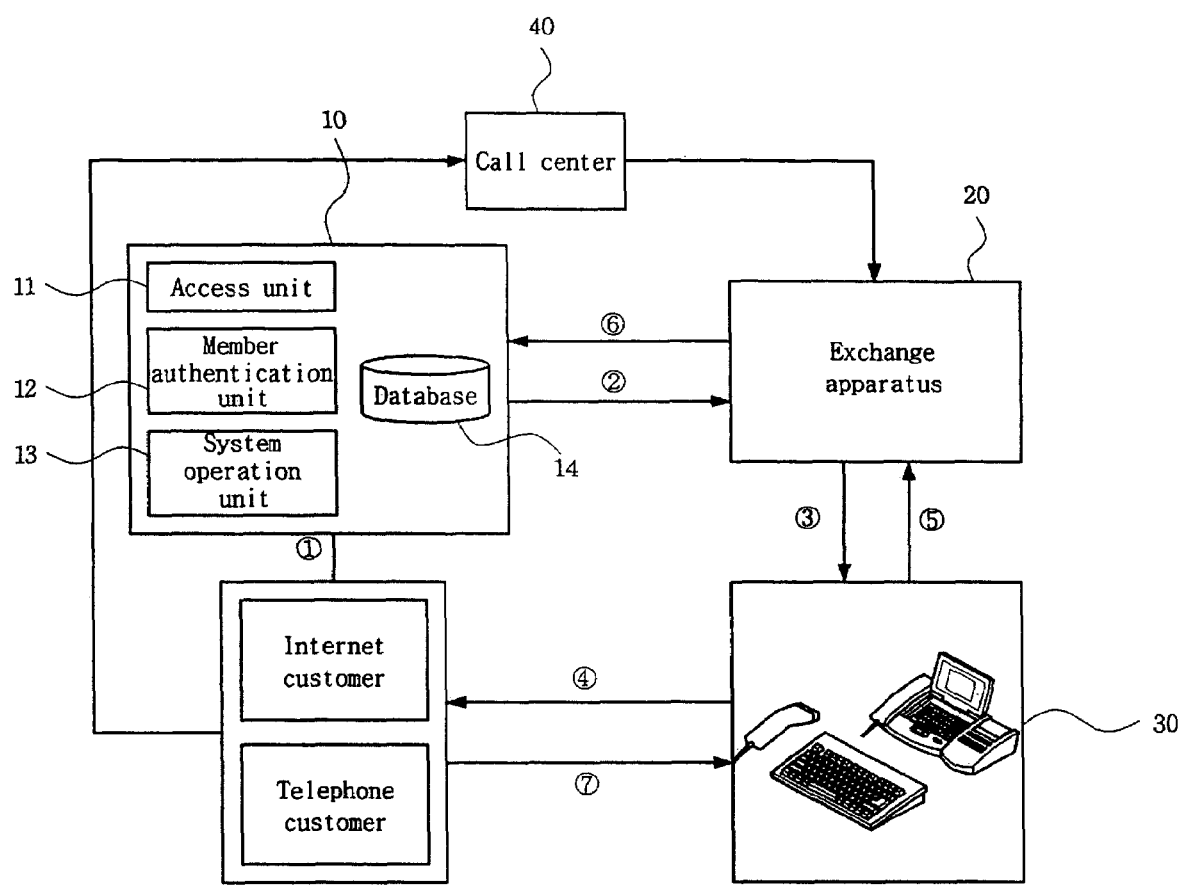
FIG. 1 is a block diagram for explaining an on-line accomplishment authentication process using an order confirmation system according to the present invention.
Figure 2:
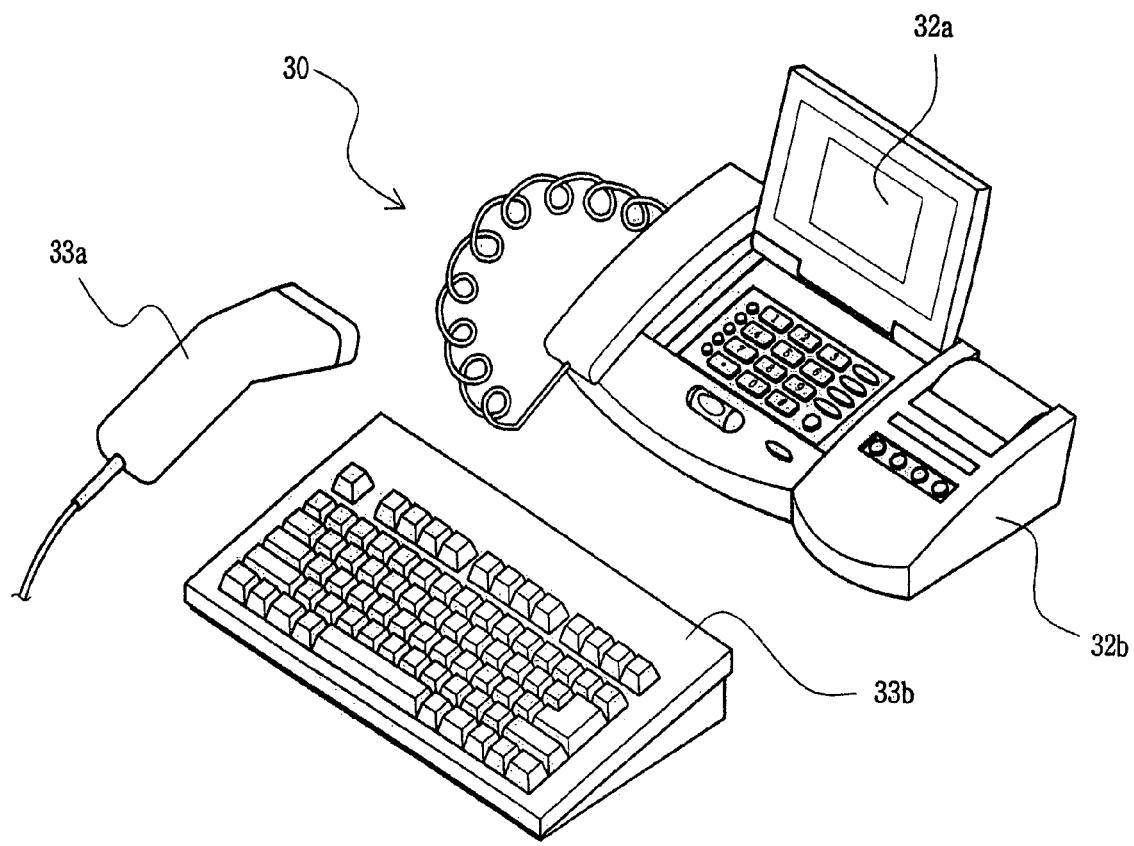
FIG. 2 is a perspective view of the order confirmation apparatus according to the present invention.
Figure 3:
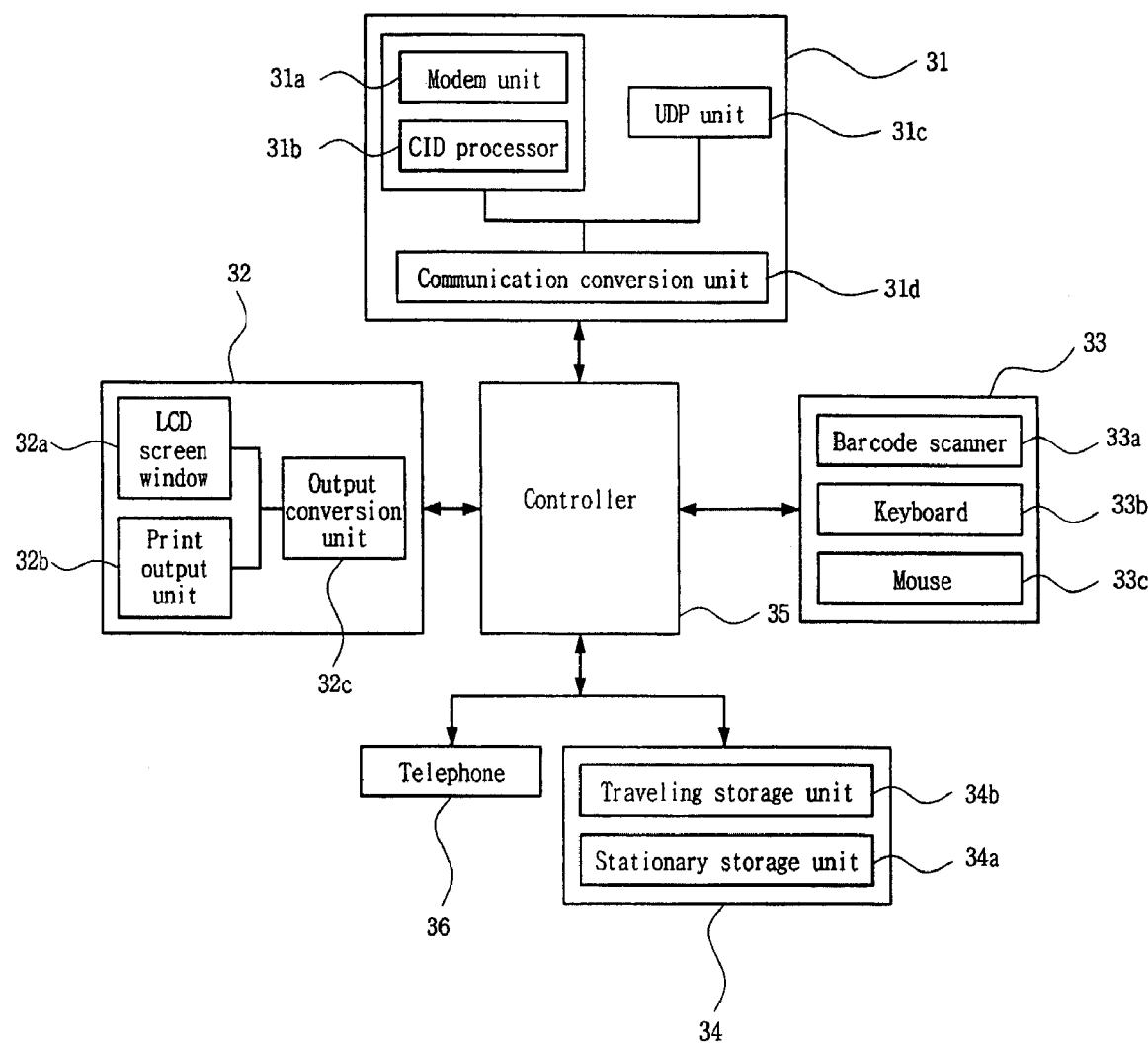
FIG. 3 is a detailed block diagram of the order confirmation apparatus according to the present invention.
Figure 4:
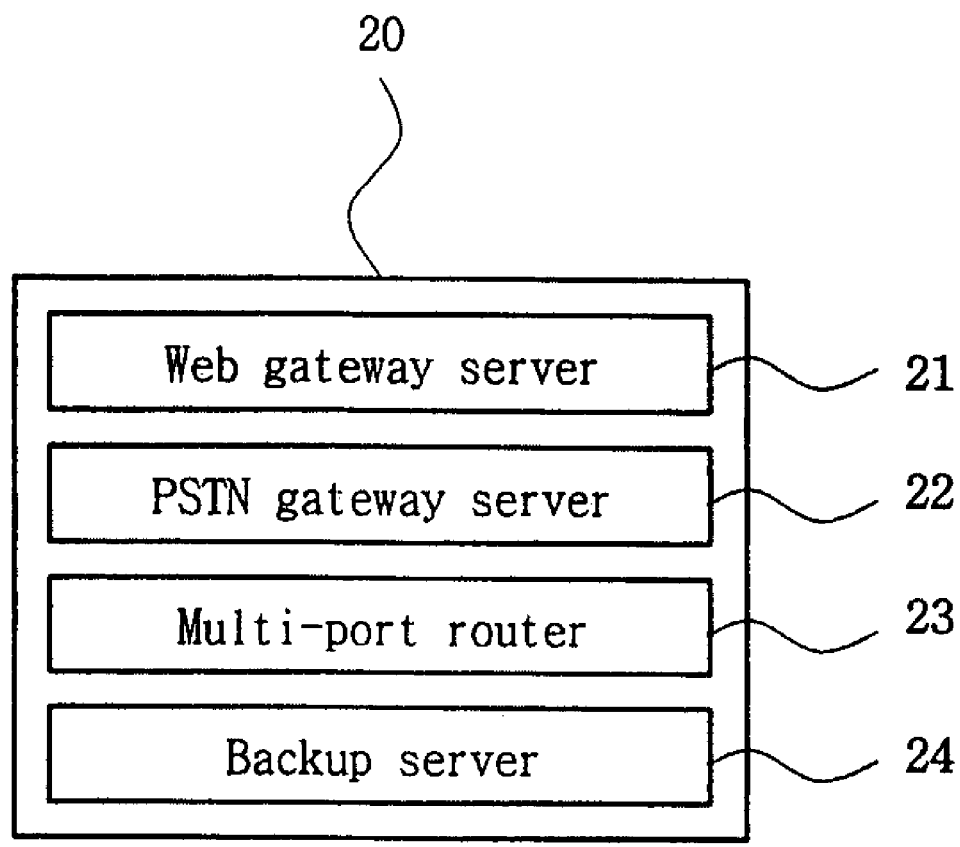
FIG. 4 shows the configuration of an exchange apparatus of the order confirmation apparatus according to the present invention.
Figure 5:
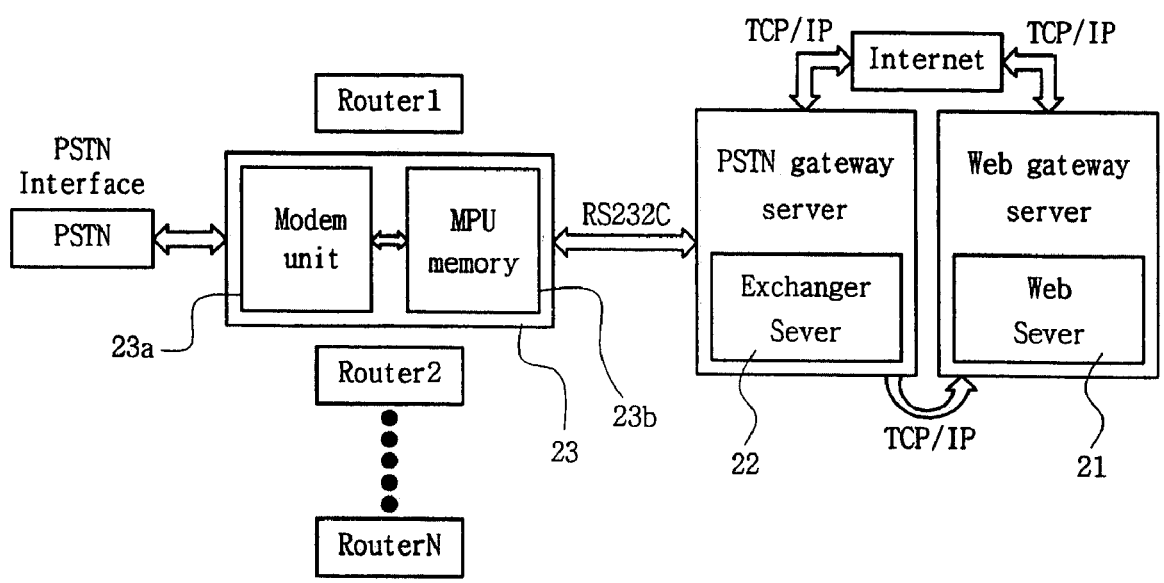
FIG. 5 is a detailed block diagram of the exchange apparatus of the order confirmation apparatus according to the present invention.

FIG. 1 is a block diagram for explaining an on-line accomplishment authentication process using an order confirmation system according to the present invention. FIG. 2 is a perspective view of the order confirmation apparatus according to the present invention. FIG. 3 is a detailed block diagram of the order confirmation apparatus according to the present invention. FIG. 4 shows the configuration of an exchange apparatus of the order confirmation apparatus according to the present invention. FIG. 5 is a detailed block diagram of the exchange apparatus of the order confirmation apparatus according to the present invention.

FIG. 1 is a block diagram for explaining an on-line accomplishment authentication process using an order confirmation system according to the present invention.

Referring to FIG. 1, a user becomes a member of an Internet shopping mall 10 that provides predetermined contents by inputting his or her information such as name, an address, a common telephone number and a mobile phone number. In the case where transactions such as order, purchase and reservation for desired merchandise are performed on a member shop of a contents-providing Internet shopping mall 10 using a wired or wireless telephone that has been registered when becoming a member in an environment in which the Internet is not available, transaction accomplishment performed on the wired or wireless telephone is authenticated as on-line transaction accomplishment. Further, in the event that a customer who has became a member of the Internet shopping mall 10 performs transactions such as order, purchase and reservation for desired merchandise are performed on a member shop of the contents-providing Internet shopping mall 10 using a call center 40, it is authenticated as on-line transaction accomplishment. Thus, use accomplishment of an on-line member through an off-line path is authenticated as on-line use accomplishment.

The Internet shopping mall 10 provides information on a variety of products through the Internet. In this Internet shopping mall 10, member shops can share information on their products so that registration and purchase on the products can be performed in real time through an Internet network or a PSTN network. The Internet shopping mall 10 includes an access unit 11, a member authentication unit 12, a system operation unit 13 and a database 14.

If a user has access to the access unit 11 of the Internet shopping mall 10, the member authentication unit 12 determines whether the user is assigned with member authority by referring to the database 14. If it is determined that the customer is not assigned with member authority, the member authentication unit 12 introduces the user to assign member authority through a predetermined member joining procedure. The system operation unit 13 drives ASP (Active Server Pages) and CGI (Common Gateway Interface) scripts according to a command language of a user so that a corresponding command is executed, and then stores order information on goods that will be purchased by a customer on the Internet or provides order information data to the order confirmation apparatus 30 of a corresponding member shop.

The execution script is used to expand the function of a web server of the Internet shopping mall 10, and controls the database 14 to extract data corresponding to a command, store input data, or delete or process data. The user's basis information stored in the database 14 is transmitted to an order confirmation apparatus 30 of each member shop and is then stored in storage unit 34. Data for a user's transaction history that is received from the order confirmation apparatus 30 of each member shop are stored on a specified record and field with them being classified on a category basis of the database 14.

If a customer has access to the database 14 through the Internet, the database 14 determines whether the customer is a user to which member authority is given, and then stores information on the member on a category basis depending upon a predetermined classification system. In this case, the member's basic information stored in the database 14 is sent to the order confirmation apparatus 30 of each member shop and is then stored in the storage unit 34. The database 14 receives a transaction history for goods that are ordered through the order confirmation apparatus 30 of each member shop, and stores it on a category basis of the database 14 so that a customer's information can be updated in real time.

The call center 40 receives a purchase call, which is made by a customer through a telephone service such as 1588 or 700 service, which is provided by communication service providers, designates a member shop corresponding to the input order information of the customer, and sends the input order information to the order confirmation apparatus 30 of the designated member shop through an exchange apparatus 20. The order confirmation apparatus 30 receives the customer's order information from the call center 40, and controls corresponding order information to be output through output paper.

The configuration of the exchange apparatus 20 and the order confirmation apparatus 30 installed at each member shop will now be described in detail.

(1) A user inputs his information such as name, an address, a common telephone number, a mobile phone number and additional information to a web server for member joining.

(2) The user's information stored in the web server is transmitted to the exchange apparatus 20 on the premise that the user has acceded to have his input information to be used for the purpose of a member shop service of an Internet shopping mall of which the user has became a member.

(3) The exchange apparatus 20 sends corresponding data of the user to the storage unit 34 of the order confirmation apparatus 30 installed at a member shop.

(4) In a state where the user's information is stored in the order confirmation apparatus 30 of the member shop, if the user performs order, purchase, reservation and offering posting on the member shop using a wired or wireless telephone, a seller stores transaction results through the order confirmation apparatus 30.

(5) The seller sends data related to the transaction results to the exchange apparatus 20.

(6) The exchange apparatus 20 sends the data related to the transaction results to the web server 10 so that transaction accomplishment can be authenticated in the main server of the Internet shopping mall that provides contents. Thus, although a user orders goods using a wired or wireless telephone not the Internet, transactions can be performed to authenticate on-line transaction accomplishment, and the member shop of the Internet shopping mall can provide desired goods depending upon a customer's order slip to the customer.

FIG. 2 is a perspective view of the order confirmation apparatus 30 according to the present invention.

Referring to FIG. 2, the order confirmation apparatus 30 disposed on the part of a seller serves to send and output, in real time, a transaction history such as order, purchase, reservation and offering posting of a customer through the Internet, data the same transaction history on a wired or wireless telephone, and store it in the web server 10. The order confirmation apparatus 30 includes a telephone 36, a print output unit 32b, a keyboard 33b and a barcode scanner 33a.

The telephone 36 may include a handset, a dial button, a direct connection button, etc., all of which have a telephone function of a known telephone as a basic function. The telephone 36 constitutes a LCD screen window 32a, which receives an order call through a customer's wired or wireless telephone and outputs input goods order history information.

The print output unit 32b includes control buttons having a variety of functions, and paper on which information on a customer's order history can be output so that goods order information transmitted through a customer's wired or wireless telephone can be written into the paper. The keyboard 33b includes a variety of buttons having unique functions, through which predetermined information can be input to write an order slip suitable for a customer's order information, and offering information, etc. can be input to an Internet shopping mall. The barcode scanner 33a serves to recognize barcode to classify selling products on a product or specification basis, and then provide corresponding information to an Internet shopping mall.

FIG. 3 is a detailed block diagram of the order confirmation apparatus 30 according to the present invention.

Referring to FIG. 3, the order confirmation apparatus 30 includes a communication unit 31 that receives a customer's order history data transmitted through a PSTN network and an Internet network, an output unit 32 that outputs a customer's order information on a LCD and print paper, an input unit 33 through which necessary information can be input when a customer's order information is output and the information has to be sent to the web server 10, a storage unit 34 that stores a customer's basic information and order information, a controller 35 for setting a communication environment according to a condition set by a user, controlling the units to output the customer's order information in real time and controlling the order information to be transmitted on-line, and a telephone 36.

The communication unit 31 includes a modem unit 31a, a caller identity (hereinafter, referred to as "CID") processor 31b, a user datagram protocol (hereinafter, referred to as "UDP") unit 31c and a communication conversion unit 31d. The modem unit 31a is connected to the PSTN network, and receives order information data transmitted through a customer's wired or wireless telephone. The CID processor 31b confirms CID of a wired or wireless telephone that transmits a customer's order information. The UDP unit 31c allows for TCP/IP access for receiving data transmitted through the Internet network. The communication conversion unit 31d sets a communication environment to the Internet network or the PSTN network according to a condition set by a user.

The output unit 32 includes a LCD (Liquid Crystal Display) screen window 32a, a print output unit 32b and an output conversion unit 32c. The LCD screen window 32a classifies a customer's order information transmitted through the Internet network or the PSTN network according to an off-line order history and an on-line order history, and provides the classified history to a seller. The seller receives an order that is received through a telephone displayed on the LCD screen window 32a, and sends a newly input transaction history to the web server 10. The print output unit 32b outputs order information received from a customer through the Internet network or the PSTN network. The output conversion unit 32c outputs order information data received from a customer to the LCD screen window 32a or the print output unit 32b through the Internet network or the PSTN network under the control of the controller 35.

The input unit 33 includes a barcode scanner 33a, a keyboard 33b, a button pad (not shown), and a mouse 33c. The barcode scanner 33a classifies goods that will be sold by a seller on a product or specification basis. The keyboard 33b allows a user to modify a customer's order information displayed on the LCD screen window 32a, or input necessary information when the customer's purchase information is sent to the web server 10. The button pad includes buttons having unique functions, through which necessary information is input. The mouse 33c allows a user to input a customer's order information and purchase information.

The storage unit 34 includes a stationary storage unit 34a and a traveling storage unit 34b. The stationary storage unit 34a stores operating software for controlling the controller 35 and stores data for the initialization of the controller 35 so that data received through the Internet network or the PSTN network can be recognized. The traveling storage unit 34b stores a telephone number of a customer who is joined as a member in order to confirm whether a customer's telephone number received through the PSTN network is a telephone number of a member who is joined as a member using a flash memory, and stores customer management software for allowing a customer to select a desired product using the wired or wireless telephone so that an order history can be written.

The controller 35 receives a customer's order information data received through the Internet network or the PSTN network, and applies a control signal to a corresponding component so that information on the input order history can be displayed on the LCD screen window 32a, the information can be output on paper as an order slip through the print output unit 32b, and information on the customer's purchase history can be transmitted to the web server 10 that provides on-line contents.

The telephone 36 may have the same shape and technical construction as a known common telephone.

FIG. 4 shows the configuration of the exchange apparatus 20 of the order confirmation apparatus according to the present invention. FIG. 5 is a detailed block diagram of the exchange apparatus 20 of the order confirmation apparatus according to the present invention.

Referring to FIGS. 4 and 5, the exchange apparatus 20 includes a multi-port router 23 that transmits and receives data through the PSTN network, a web gateway server 21 that receives data generated from a web sit, a PSTN gateway server 22 that transmits data generated from the web gateway server 21 through a router, and a backup server 24 that backups data.

The multi-port router 23 is operated so that the number of routers can vary in N number according to a communication environment depending upon the number of member shops each having the order confirmation apparatus 30 installed in. The multi-port router 23 includes a modem unit 23a and a MPU memory 23b, and it is connected to the PSTN gateway server 22 by way of RS232C communication so that it can receive data generated from a PSTN and transmit data received from the PSTN gateway server 22.

The web gateway server 21 searches the database 14 that stores Internet order data of the Internet shopping mall 10 at a predetermined time interval in order to fetch corresponding data in real time, receives order data when the Internet shopping mall 10 transmits the order data of the database 14 that stores Internet order data, transmits corresponding data to the PSTN gateway server 22 that is connected thereto through TCP/IP, sends data received from the PSTN gateway server 22 to the Internet shopping mall 10 so that the data can be stored in the database 14.

The PSTN gateway server 22 converts data transmitted from the web gateway server 21 so that the data can be transmitted through the PSTN network, sends the converted data to a corresponding router of the multi-port router 23 so that the data are transmitted to a corresponding order confirmation apparatus 30 through the PSTN network and then stored in the storage unit, and receives data, which are transmitted through the PSTN network from the order confirmation apparatus 30, via a corresponding router. In this case, the PSTN gateway server 22 converts the received data so that the data can be transmitted through the Internet network, and sends the converted data to the web gateway server 21.

The backup server 24 controls data, which are exchanged between the Internet shopping mall 10 and the order confirmation apparatus 30 installed at each member shop, to be stored in corresponding record and field according to a predetermined classification system for a predetermined time.

An order confirmation process of the order confirmation apparatus constructed above according to the present invention will now be described.

Figure 6:
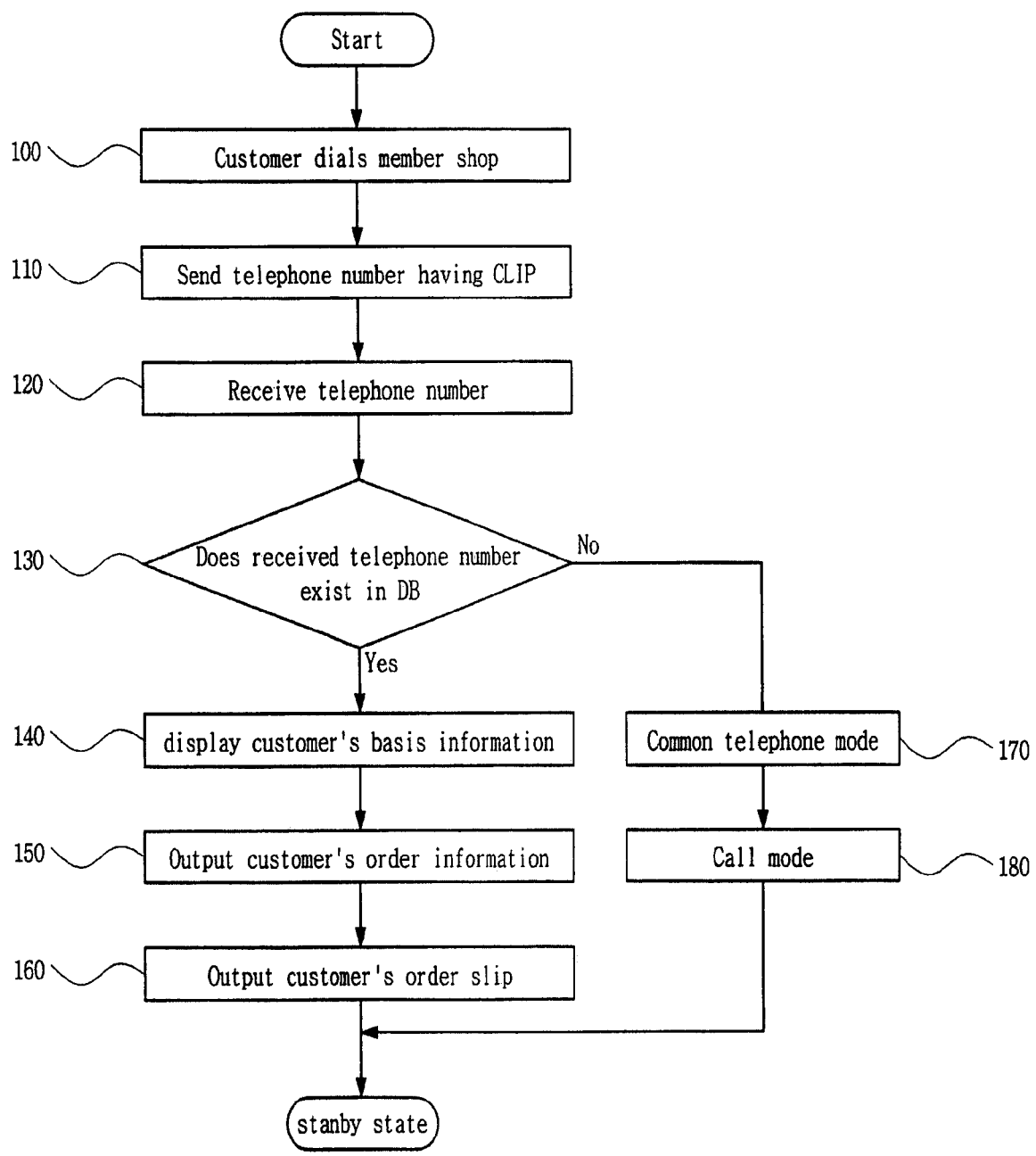
FIG. 6 is a flowchart illustrating an order confirmation process using CLIP according to the present invention.

FIG. 6 is a flowchart illustrating an order confirmation process using CLIP according to the present invention.

If a customer who has became a member of an Internet web site that provides predetermined contents dials the order confirmation apparatus 30 disposed on the part of the seller through the PSTN network using a wired or wireless telephone (100), the call passes through a switchboard of a telephone office. In this process, CLIP service confirms a telephone number from which the call is originated by referring to a subscriber database disposed in the telephone office, and sends a confirmed telephone number to the order confirmation apparatus 30 disposed on the seller side (110).

The order confirmation apparatus 30 receives the telephone number transmitted through a telephone circuit (120), compares the received telephone number with a telephone number stored in a database of the storage unit 34 (130). As a result of the comparison, if the received telephone number coincides with a telephone number stored in the database, the order confirmation apparatus 30 executes a customer management program while displaying a customer's basis information stored in the storage means on the LCD screen window 32a (140), outputs a customer's input order information (150) and output an order slip on paper through the print output unit 32b (160). Meanwhile, if the received telephone number does not coincide with the telephone number stored in the database, the order confirmation apparatus 30 displays, on the LCD screen window, that the received telephone number is a new customer, and switches to a communication mode (170) so that a signal is connected to the common telephone (180).

That is, if a customer who has became a member of the Internet web site that provides contents attempts a call through the wired or wireless telephone, a subscriber database disposed in the telephone office is searched for a customer's telephone number while the call passes through the switchboard of the telephone office, and the searched telephone number is transmitted to the order confirmation apparatus 30 disposed on the part of the seller. In case of using this CLIP service, telephone number data of the originator are transmitted in a state where the data are intervened between a first bell signal and a second bell signal, which are sent to a recipient from the telephone office. The order confirmation apparatus 30 captures a signal of a first incoming bell that is transmitted through the telephone circuit by means of a ring detection circuit of the telephone office. If there exist telephone number data transmitted in FSK DATA mode, the order confirmation apparatus 30 receives the telephone number and compares the telephone number with a customer's telephone number stored in the database of the storage unit 34.

As a result of the comparison, if the received telephone number coincides with the customer's telephone number stored in the database of the storage unit 34, the order confirmation apparatus 30 recognizes the received telephone number as a member customer, executes a customer management program so that the customer's order can be input, and controls the customer's order slip to be output on the LCD screen window 32a and the print output unit 32b. The order receipt processing method will be described in detail. A customer's basis information is displayed on the LCD screen window 32a simultaneously with an incoming call. In this case, products that are directly input by a merchandise supplier are displayed so that the customer can select an ordered product. If the merchandise supplier selects and confirms the type and number of goods at the request of the customer, the type and number of the confirmed goods are sent to the print output unit 32b and are then stored in the storage unit 34.

Meanwhile, if the received telephone number does not coincide with the customer's telephone number stored in the database of the storage unit 34, the order confirmation apparatus 30 displays, on the LCD screen window 32a, that the received telephone number does not have customer information stored in the storage unit 34 and is thus a new customer. Meanwhile, if the received telephone number coincides with the telephone number of the PSTN switchboard, which is stored in the storage unit 34 of the order confirmation apparatus 30, the order confirmation apparatus 30 switches to dedicated mode for data reception.

The process in which the order confirmation apparatus 30 receives the telephone number of the originator, and compares the received telephone number with that stored in the database of the storage unit 34 to decide a member customer or a new customer as described above is completed before the second incoming bell signal arrives after the first incoming bell signal. Generally, in case of using the CLIP service, as the first incoming bell signal is mute and thus not output through the telephone 36, but the second incoming bell signal is output through the telephone 36, the seller can receive any calls by considering them as the common call because the order confirmation apparatus 30 automatically selects and outputs calls from customers who have became a member of the Internet shopping mall. It allows for the use of goods order information and common call in which an order is made on the Internet through one telephone circuit.

Further, if a manager who manages the Internet shopping mall 10 receives a customer's goods order information from a shopping mall web site or a customer's goods order information from the call center 40 of the Internet shopping mall 10, the goods order information is processed in real time and is then sent to the order confirmation apparatus 30 of a member shop that sells corresponding goods desired by the customer through the PSTN network. In this case, the Internet shopping mall 10 sends data always using a unique telephone number so that the unique telephone number can be output to the order confirmation apparatus 30 of the member shop through the CLIP service. In that case, in view of the Internet shopping mall 10 that holds lots of members, there exists a case where data have to be sent lots of places at a time. Thus, it is necessary to increase the switchboard in order to process the data.

If the Internet shopping mall 10 sends data, the data pass through the switchboard of the telephone office. In this process, the CLIP service confirms a telephone number of a place from which the data are originated by referring to a subscriber database within the telephone office, and first sends a confirmed telephone number to a recipient. The order confirmation apparatus 30 of a corresponding member shop first receives the telephone number transmitted through the PSTN network, and compares the received telephone number with a telephone number stored in the database of the storage unit 34. As a result of the comparison, if the received telephone number coincides with the telephone number stored in the database of the storage unit 34, the order confirmation apparatus 30 automatically switches to the data communication mode, and then automatically stores data that are received subsequently, and processes and outputs the stored data. Meanwhile, if the received telephone number does not coincide with the telephone number stored in the database of the storage unit 34, the order confirmation apparatus 30 automatically switches to the common call mode in which a signal is connected to the common call.

Figure 7:
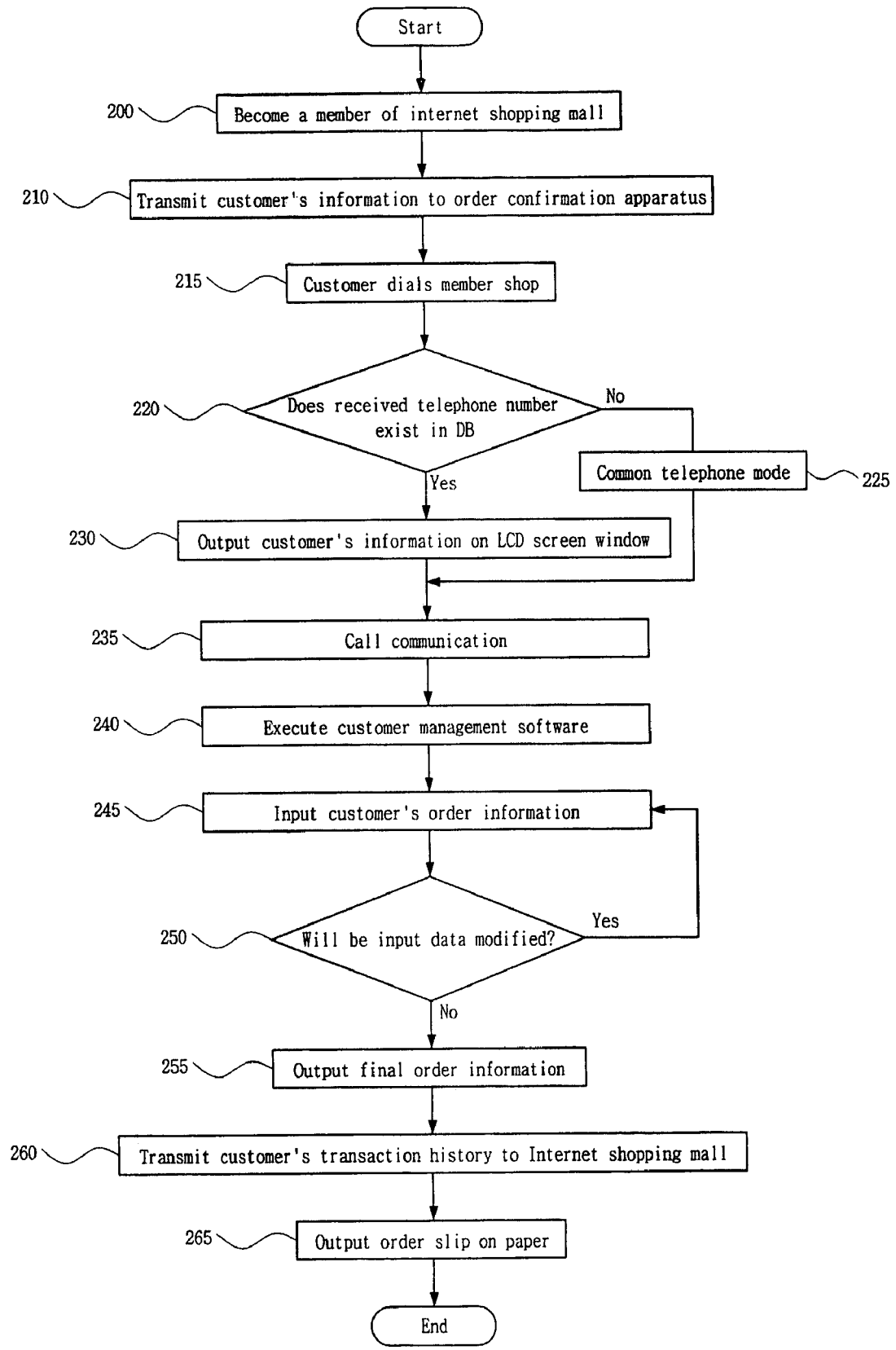
FIG. 7 is a flowchart illustrating a goods order and on-line accomplishment authentication process using the order confirmation system according to the present invention.

FIG. 7 is a flowchart illustrating a goods order and on-line accomplishment authentication process using the order confirmation system according to the present invention.

A common Internet user has access to the Internet shopping mall 10, which provides predetermined contents on-line, through the access unit 11, becomes a member of the Internet shopping mall 10 through the member authentication unit 12 (200), and inputs essential basic information required by the Internet shopping mall, such as an address, name, a telephone number and a mobile telephone number. In this case, the Internet shopping mall ask the user's assent to have his input information to be used for the purpose of providing a customer's information, and sends the customer's information stored in the database 14 of the web server 10 to the order confirmation apparatus 30 on the part of a seller being a member shop (210).

If the customer who has became a member of the Internet shopping mall 10 dials the order confirmation apparatus 30 disposed in the seller being the member shop (215), a telephone number provided by CID service of the incoming call is received to determine whether the same telephone number exists in the customer's telephone number information stored in the storage unit 34 (220). If the customer's same telephone number exists, the customer's information stored in the storage unit 34 is output to the LCD screen window 32a (230) and the call is then connected (235). Meanwhile, if the customer's same telephone number does not exist, the call is displayed as a new customer on the LCD screen window 32a (225) and is then connected (235).

In this case, the order confirmation apparatus 30 can display "this is . . . web site customer" as messages before the call is connected or let the customer hear "this is . . . web site customer" as voice using a recorded memory in order to advertise the Internet shopping mall.

If the order confirmation apparatus 30 is connected to the wired or wireless telephone of the customer, the controller 35 executes the customer management software stored in the storage unit 34 (240), and controls the LCD screen window to display information on goods, specification, number and options of the member shop with a list of the customer being displayed thereon. The customer then selects the menu displayed on the LCD screen window 32a to input predetermined information through the input unit 33 such as the barcode scanner 33a, the keyboard 33b and the mouse 33c (245). In this case, the information on goods, specification, number and options of the member shop refers to information on goods of a corresponding member shop, which is previously input by a user, while setting the order confirmation apparatus 30. In this case, a new customer is allowed to become a member by inputting an address value and a telephone number value in a customer database.

If the customer's order information is input, it is determined whether final order information will be stored, modified or deleted (250). In case of storage, the customer's final order information is displayed on the LCD screen window 32a (255), the order information data are sent to the web server 10 of the Internet shopping mall, and are then stored in the database 14 so that the customer information can be updated (260). Thus, even in the case where a customer places an order using a wired or wireless telephone, it can be authenticated as transaction accomplishment on-line. If the customer's order information is displayed on the LCD screen window 32a through the above process, the controller 35 applies a control signal to the print output unit 32b. The print output unit 32b prints the customer's order information on paper, and outputs an order slip (265). In this case, with respect to the type of output matter output on paper through the print output unit 32b, as shown in FIG. 9, order letters in which order information is written can be output with them being classified into a customer use and a shop use, and the total of sales is found on a shop basis, thus improving management of customers and business efficiency. If a call is received from a customer while being absent, customer's telephone number data are searched, and a received date, a received time and a customer name are stored so that processing results accordingly can be output and customer management is first performed.

In the case where the order confirmation apparatus 30 is not connected to the customer's wired or wireless telephone due to absence as above, the controller 35 sends a control signal value informing absence to an Internet shopping mall through the exchange apparatus 20. The Internet shopping mall receives the signal value from the order confirmation apparatus 30 of a predetermined member shop, inactivates an icon that displays a corresponding member shop that is being displayed on a web site so that absence can be displayed.

If absence is set in the member shop, a system program sends confirmation on normal or erroneous input to a mobile telephone of an operator of the member shop via SMS.

Figure 8:
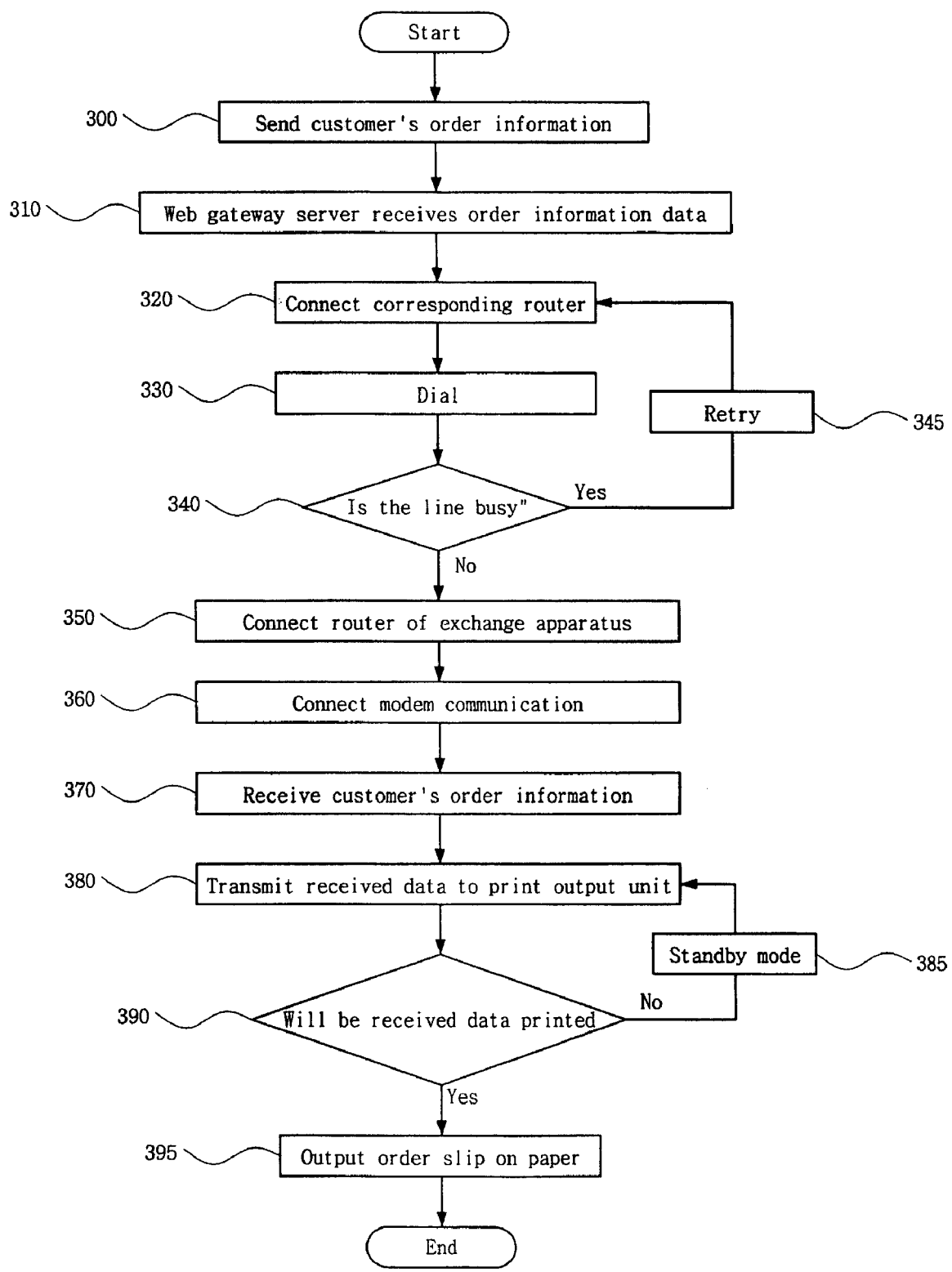
FIG. 8 is a flowchart illustrating a process of ordering goods through an Internet network according to the present invention.

FIG. 8 is a flowchart illustrating a process of ordering goods through an Internet network according to the present invention.

Referring to FIG. 8, a customer has access to the Internet shopping mall 10 through the access unit 11, gets member authority through a member authentication process by the member authentication unit 12, inputs information such as purchase, reservation, order and offering posting, selects a member shop that sells desired goods, and then sends order information data to a corresponding member shop (300). The system operation unit 13 then stores the customer's order information in the database 14, and then sends the order information data to the exchange apparatus 20.

The web gateway server 21 of the exchange apparatus 20 receives the order information data (310), and sends them to the PSTN gateway server 22 for data conversion so that the order information data can be sent through the PSTN network.

If the customer's order information data are converted through the PSTN gateway server 22, a corresponding router of the multi-port router 23, which is connected to a corresponding member shop, is set (320), and the customer's order information data are sent to the router so that a call is dialed to the order confirmation apparatus 30 disposed on the part of a seller (330).

If the line is busy (340), a call is again attempted (345). If the line is not busy, the order confirmation apparatus 30 compares the telephone number assigned to the exchange apparatus 20, which is received from the exchange apparatus 20 through the CID processor 31b, and the telephone number stored in the storage unit 34. If the two telephone numbers coincide with each other, the order confirmation apparatus 30 switches to the communication mode, and attempts connection to the router of the exchange apparatus 20 to receive the customer's order information (350). If the two telephone numbers do not coincide with each other, the order confirmation apparatus 30 switches to the common telephone mode.

If the customer's order information data are received (370) through the modem unit 31a of the order confirmation apparatus 30 (360), the received data are transmitted to the print output unit 32b (380), which then determines whether the received data can be printed (390). If a print state is incomplete, the print output unit 32b is set to a print standby mode (385). If a print output is possible, the print output unit 32b finally confirms whether the received data can be printed and outputs them on paper as an order slip (395).

Furthermore, the customer who has became a member of the Internet shopping mall 10 can dial the call center 40 connected to 1588 or 700 telephone number that are provided by communication service providers, and provide order information on desired goods through a consultant. If the customer's input order information data are sent to a corresponding member shop through the consultant, they are transmitted to the order confirmation apparatus 30 installed in a corresponding member shop through the exchange apparatus 20. The order confirmation apparatus 30 receives the customer's order information from the call center 40, and outputs corresponding order information through output paper.

As described above, in the case where a customer purchases desired goods that are sold at a member shop of an Internet shopping mall using a wired or wireless telephone, it is determined whether the call is a goods order call or a common call through a CLIP service, and the customer is induced to input order information when the call is the good order call. Information on the customer's transaction history is sent to a web server of the Internet shopping mall so that it can be authenticated as transaction accomplishment.

As described above, according to the present invention, in the case where a customer uses the Internet and a wired and wireless telephones through CID, an order confirmation apparatus installed on the part of a seller determines whether a call from the customer is data of an Internet customer or a common call. If it is determined that the call is an order call, the order confirmation apparatus outputs it on a LCD screen window so that the customer can input order information and outputs an order slip on output paper. The order confirmation apparatus sends the customer's transaction history to a web server of an Internet shopping mall so that the transaction history can be authenticated as transaction accomplishment on-line. Therefore, a customer can purchase desired goods using a common wired or wireless telephone not the Internet and the same transaction accomplishment as that through on-line can be authenticated. Accordingly, there is an effect in that Internet contents can be activated.

Further, a customer's order information that is received through a telephone can be digitized, stored and then printed on output paper so that it can be used as a slip. Therefore, a business processing procedure can be shortened to improve work efficiency, customers can be managed in a systematic manner, and information on the Internet can be exchanged only through an existing telephone circuit without using an additional Internet network. It is thus possible to realize electronic commerce at low cost. Further, since electronic commerce of small-sized shops as well as large-scale shopping malls can be realized, there is an effect in that lift Internet is possible.

While the present invention has been described with reference to the particular illustrative embodiments, it is not to be restricted by the embodiments but only by the appended claims. It is to be appreciated that those skilled in the art can change or modify the embodiments without departing from the scope and spirit of the present invention.

What is claimed is:

1. An order confirmation system using CLIP, comprising:
a) means for transmitting information on a member, which is joined as a member of an Internet shopping mall and stored in a database of a web server, to an order confirmation apparatus installed as a member shop, and then databasing the information;
b) means for determining whether a telephone number received through a customer's wired or wireless telephone exists in the telephone number stored in the database using a CLIP service;
c) means for, if the received telephone number exists in the telephone number stored in the database, recognizing the telephone number as a member customer, executing a customer management program and then processing input order information, and if the received telephone number does not exist in the telephone number stored in the database, recognizing the telephone number as a new customer and then connecting the telephone number to a common telephone;
d) means for, if a call coincident with a telephone number of a PSTN switchboard that transmits data to the order confirmation apparatus is received, automatically switching to a data receive mode, receiving data, and outputting the received data on a LCD screen window; and
e) means for printing the customer's input order information, which is displayed on the LCD screen window, on paper in the form of an order slip, wherein the order confirmation apparatus comprises:
i) communication means having a modem unit connected to a PSTN network for receiving order information data transmitted through the customer's wired or wireless telephone, an caller ID (CID) processor for confirming CID of the wired or wireless telephone, an UDP unit connected to an Internet network for receiving the customer's order information data, and a communication conversion unit for setting a communication environment according to a condition set by a user;
ii) output means having a LCD screen window for displaying the Customer's order information so that an order history can be input, a print output unit for printing the customer's order history displayed on the LCD screen window on paper, and an output conversion unit for converting the customer's order history so that the order history can be output through the LCD screen window or the print output unit under the control of a controller;
iii) input means for writing an order slip by inputting the customer's order information displayed on the LCD screen window, and inputting information necessary to transmit information on the customer's transaction history to a web server of the Internet shopping mall;
iv) storage means having a stationary storage unit for storing operating software for controlling the controller and data transmitted through the Internet network or the PSTN network, and a traveling storage unit for storing information of customers who are joined as members of an Internet shopping mall and customer management software for helping a seller to write a history of an order, which is received through the customer's wired or wireless telephone; and
v) control means for receiving the customer's order information transmitted through the Internet network or the PSTN network, displaying the customer's order history received through the input means on the LCD screen window, controlling a print output unit to print the order history on paper, transmitting the customer's transaction history to a web server of an Internet shopping mall.

2. An order confirmation system using CLIP, comprising:
a) means for transmitting a customer's order information received through a call center to one or more order confirmation apparatuses through an exchange apparatus;
b) means for allowing the order confirmation apparatus to compare a telephone number assigned to the exchange apparatus and a telephone number stored in a storage means;
c) means for, if it is determined that the two telephone numbers coincide with each other, switching to communication mode to receive the customer's order information data through one or more routers of the exchange apparatus, and if it is determined that the two telephone numbers do not coincide with each other, switching to common telephone mode to connect to a call; and
d) means for controlling a print output unit to print the Customer's order information, which is displayed on a LCD screen window, on paper in the form of an order slip, wherein the exchange apparatus designates the number of routers according to the number of an order confirmation apparatus of each member shop,
the exchange apparatus includes:
i) a multi-port router having a modem unit and a MPU memory, for transmitting and receiving data through a PSTN network;
ii) a PSTN gateway server connected to the multi-port router through RS232C communication, for converting data when the data are transmitted to a PSTN network or an Internet network;
iii) a web gateway server for reading order information data in real time by searching a database of an Internet shopping mall or receiving order information data from the Internet shopping mall, and transmitting the order information data to the PSTN gateway server; and
iv) a backup server for storing data, which are exchanged between the Internet shopping mall and an order confirmation apparatus disposed at each member shop, according to a predetermined classification system.

* * * * *